United States Patent
Adkins, III et al.

(10) Patent No.: US 8,200,583 B1
(45) Date of Patent: *Jun. 12, 2012

(54) METHOD AND SYSTEM FOR LEASING OR PURCHASING DOMAIN NAMES

(75) Inventors: James N. Adkins, III, Bellevue, WA (US); Todd Edebohls, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/861,649

(22) Filed: Aug. 23, 2010

Related U.S. Application Data

(63) Continuation of application No. 11/963,731, filed on Dec. 21, 2007, now Pat. No. 7,805,379.

(60) Provisional application No. 61/014,713, filed on Dec. 18, 2007.

(51) Int. Cl.
*G06Q 10/00* (2012.01)
(52) U.S. Cl. ...................................................... 705/307
(58) Field of Classification Search .................. 705/1.1, 705/307
See application file for complete search history.

(56) References Cited

U.S. PATENT DOCUMENTS

| | | | |
|---|---|---|---|
| 5,940,595 A | 8/1999 | Reber et al. | |
| 6,009,103 A | 12/1999 | Woundy | |
| 6,298,341 B1 | 10/2001 | Mann et al. | |
| 7,007,080 B2 | 2/2006 | Wilson | |
| 7,188,138 B1 | 3/2007 | Schneider | |
| 7,526,538 B2 | 4/2009 | Wilson | |
| 7,631,101 B2 | 12/2009 | Sullivan et al. | |
| 7,805,379 B1 | 9/2010 | Adkins et al. | |
| 2002/0065903 A1 | 5/2002 | Fellman | |
| 2002/0099637 A1 | 7/2002 | Wilkinson et al. | |
| 2002/0128985 A1* | 9/2002 | Greenwald | 705/400 |
| 2003/0120597 A1 | 6/2003 | Drummond et al. | |
| 2003/0229692 A1 | 12/2003 | Vo | |
| 2004/0148398 A1 | 7/2004 | Park | |
| 2004/0199397 A1 | 10/2004 | Dresden | |
| 2005/0027882 A1 | 2/2005 | Sullivan et al. | |
| 2005/0080927 A1 | 4/2005 | Anderson et al. | |
| 2005/0105513 A1 | 5/2005 | Sullivan et al. | |

(Continued)

OTHER PUBLICATIONS

Brian Bethel, "eminent Domain; Want to get on the map with your very own Website? Just follow these easy steps", Jul. 26, 2001, The Post—Tribune. Gary, Ind. p. E.3.

(Continued)

*Primary Examiner* — Dennis Ruhl
*Assistant Examiner* — Paul R Fisher
(74) *Attorney, Agent, or Firm* — Knobbe Martens Olson & Bear LLP

(57) ABSTRACT

Methods and systems are described that enable a domain name owner (i.e., a "lessor") to grant a third party (i.e., a "lessee") a lease to any domain name the lessor owns. More specifically, a lessor may use a domain name service to allow a third party (i.e., a "lessee") to lease a domain name for use or to purchase the domain name outright. More specifically, the lessor may lease a domain name to a lessee so that any user who accesses the leased domain name is directed to a network resource identified by the lessee. The lessee may also be provided the option to purchase the domain name outright from the lessor, rather than lease it. In addition, a valuation of the domain name may be generated.

27 Claims, 6 Drawing Sheets

U.S. PATENT DOCUMENTS

| | | | |
|---|---|---|---|
| 2005/0172031 | A1 | 8/2005 | Adelman |
| 2006/0004784 | A1* | 1/2006 | Ableman et al. .............. 707/100 |
| 2007/0094361 | A1 | 4/2007 | Hoynowski et al. |
| 2007/0260518 | A1* | 11/2007 | Ronen et al. .................... 705/14 |
| 2008/0147541 | A1 | 6/2008 | Jones |
| 2009/0240812 | A1 | 9/2009 | King et al. |

OTHER PUBLICATIONS

Jeff Houck, "want web address? Talk to the LandLord Boca Man Leases Internet 'Domain' Names", Aug. 16, 1999, Palm Beach Post, West Palm Beach, Fla. p. 1.B.

Business Wire, "Six-Figure Bid Has Equity.com leading Sedo's Live GreatDomains Auction", Oct. 23, 2007, Business Wire, New York.

Diana Ransom, "Running a Business: Starting Up: MyBusinessName.com; Online edition", Dec. 13, 2007, Wall Street Journal, New York, N.Y.

PR Newswire, "Web 'Real Estate' Rising in Value; Moniker Offers Unique Way to Take Advantage of Opportunity; Will Hold Largest Domain Name Auction at T.RAF.F.I.C. Conference; Top Names like Auction.com, HMO.com, DSL.com, Deposit.comAvailable to Highest Bidders," Oct. 11, 2006, PR Newswire, New York.

Nick Wingfield, "Internet Companies See Value in Misaddressed Web Traffic", Sep. 5, 2003, Wall Street Journal, New York, N.Y., p. B.1.

U.S. Appl. No. 11/963,729, filed Dec. 21, 2007, Adkins III et al.

* cited by examiner

METHOD AND SYSTEM FOR LEASING OR PURCHASING DOMAIN NAMES

CROSS-REFERENCE TO RELATED APPLICATIONS

This application claims the benefit of U.S. Provisional Patent Application No. 61/014,713, filed Dec. 18, 2007, entitled METHOD AND SYSTEM FOR LEASING OR PURCHASING DOMAIN NAMES, the disclosure of which is hereby expressly incorporated by reference, and the filing date of which is hereby claimed under 35 U.S.C. §119(e). This application is a continuation of U.S. patent application Ser. No. 11/963,731, filed Dec. 21, 2007, entitled METHOD AND SYSTEM FOR LEASING OR PURCHASING DOMAIN NAMES, and issued as U.S. Pat. No. 7,805,379, the disclosure of which is hereby expressly incorporated by reference.

BACKGROUND

The Internet has become a popular information resource for even the most unsophisticated user. The popularity of the Internet is due, in part, to the ability to locate vast amounts of resources on practically any topic imaginable. However, the vast amount of resources can also hinder those who wish to use the Internet to reach users. With so many resources, it is easy for some resources to get lost in the shuffle.

Identifying an appropriate name to associate with a network resource, such as a Web site, takes on a high level of importance. Unfortunately, many of the most recognizable or intuitive domain names have already been acquired by other parties. In addition, a potential domain name owner may simply have difficulty identifying an available domain name that best fits its network resource and that will ensure the most traffic to its network resource. On the other hand, existing domain name owners can have difficulty offering their domain names for use to third parties. As a result, a party may own numerous domain names that are not being used and whose values are not being realized.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
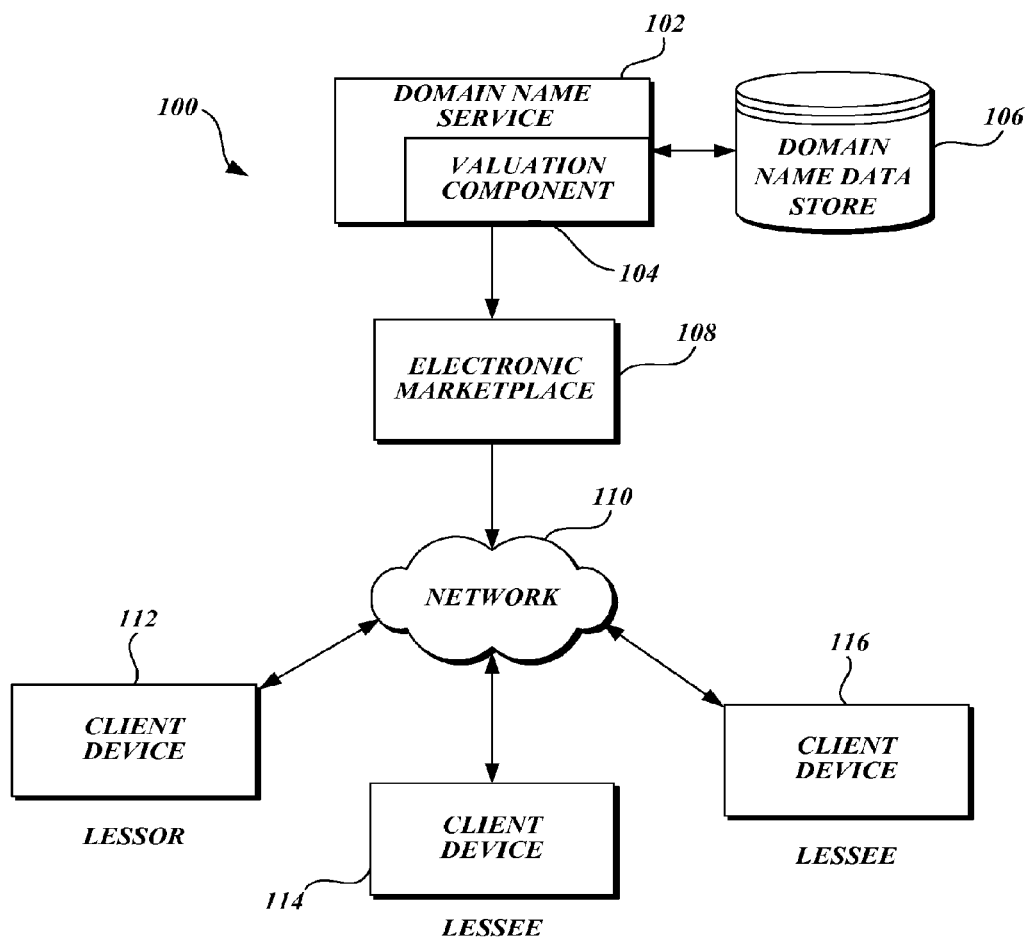
FIG. 1 is a pictorial diagram of an illustrative operating environment for implementing a domain name service to lease domain names.

Computer networks are well known in the field of communications. Computer networks may include communication links that extend over a local area, a wide area, or may even be global, as is the case of computer networks forming the Internet. The method and system disclosed herein are described in the context of the Internet. However, persons skilled in the art will recognize that the method and system disclosed herein may also be used in other interactive environments, such as local or wide area networks that connect servers storing related documents and associated files, scripts, and databases; or broadcast networks that include set top boxes or other information appliances providing access to audio or video files, documents, scripts, databases, etc. In the Internet context, such documents, files, scripts, etc., that are stored on a server are commonly referred to as a "Web site." However, in general such information can be referred to as a "network resource."

A network resource may be identified by a unique name. In some embodiments, this unique name is known as a "domain name." A domain name is typically a more memorable or human readable alphanumeric name that correlates to one or more numeric IP addresses. An IP address identifies the location in a network of a server or other network device. Multiple IP addresses may be assigned to a single domain name, or multiple domain names may be assigned to a single IP address. In some cases, domain names may be internationalized to include non-ASCII characters. Domain name registrars control the registration of domain names in order to maintain their validity. Typically, only one registrar may modify or delete information about a domain name.

Domain names typically end in a generic top level domain (gTLD) name, such as ".com" or ".biz," or in a country code top level domain (ccTLD) name such as ".de" or ".us." In addition to the top level domains, there are second level domain (SLD) names. These are the names directly to the left of ".com," ".biz," and the other top level domains. The registrars control registration of domain names including the second and top level domains. Further subdomains (i.e., names to the left of the second level domain) may be added freely by the registrant without participation by the registrar. Each domain name level may be separated by a dot or period between them. For the purposes of the present disclosure, a domain name may include at least a top level domain and a second level domain, and may further include one or more subdomains. In addition, sample domain names may be referred to herein with or without the prefix "www." Moreover, while the term domain name is used herein to describe network resources, one skilled in the art will appreciate that any type of unique identifier for a network resource (e.g., an IP address, a MAC address, etc.) may be used and not depart from the spirit and scope of the present invention.

A method and system are described that enable a domain name owner (i.e., a "lessor") to grant a third party (i.e., a "lessee") a lease to (or, in some embodiments, purchase of) any domain name the lessor owns. More specifically, a lessor may use a domain name service to allow a third party (i.e., a "lessee") to lease a domain name for use or to purchase the domain name outright. For example, a lessor may own a number of domain names including www.business.com. Another party may own the domain name www.mybusiness.com, but may wish to have access to or own the domain name www.business.com. Using the method and system described herein, the lessor may lease the domain name www.business.com to the other party so that any user who accesses www.business.com is redirected to the other party's network resource identified by www.mybusiness.com. In another embodiment, the other party may purchase the domain name outright from the lessor, e.g., via an auction for the domain name. One skilled in the relevant art will appreciate that the example described above is merely illustrative and thus should not be construed as limiting. As described in more detail below, a lease for a domain name may be for a specified period of time (e.g., minutes, hours, days, weeks, etc.), for particular times during particular days (e.g., from 12:00 p.m.-2:00 p.m. on Monday-Friday), for a specified amount of traffic, as part of a rotational usage group (e.g., round-robin), until a specified amount of business or revenue is generated, etc.

With reference to FIG. 1, an operating environment 100 is shown including a domain name service 102 that enables a lessor to lease or sell domain names it has already registered. The operating environment may further include, but is not limited to, one or more of a domain name data store 106, an electronic marketplace 108, a network 110, and client devices 112, 114 and 116. In one embodiment, the domain name service 102 is implemented by a server. The domain name service 102 may enable a lessor to lease a domain name to another party (i.e., a "lessee") so that any user who accesses the leased domain name is redirected to a network resource identified by the lessee. The term "redirect," as used herein, refers to the redirecting of traffic from one network resource to another network resource. Returning to the example above, if the lessor leases the domain name www.business.com to a single lessee, any time a user enters the domain name www-.business.com, e.g., in the address bar of a browser or by virtue of a hyperlink, the user will be taken automatically to another network resource identified by the lessee, e.g., the network resource identified by the domain name www.my-business.com.

Returning to the operating environment 100, the domain name service 102 is communicatively connected to a domain name data store 106 that stores domain names. In some embodiments, the domain name data store 106 also stores performance information, bid or purchase information, and registration information for each domain name. In addition, the domain name service 102 may include a valuation component 500. In one embodiment, the valuation component 500 is used to determine a value for a domain name, which value may be used to help determine a purchase or lease price for a domain name. The valuation component 500 will be described in greater detail below with reference to FIG. 5.

In one embodiment, a potential lessee may purchase a lease for a domain name maintained by the domain name service 102 though the electronic marketplace 108. The electronic marketplace 108 may obtain domain names available for lease or purchase from the domain name data store 106 and offer leases to those domain names, as described in more detail below.

In some embodiments, the domain name service 102 and domain name store 106 are operated independently from the electronic marketplace 108. In such cases, the electronic marketplace may retrieve available domain names from the domain name store 106 via the domain name service 102 or may retrieve available domain names from other sources, e.g., other registrars, or its own data stores. In yet other embodiments, the domain name service 102 is operated as part of the electronic marketplace 108, and thus, the electronic market place may retrieve available domain names directly from the domain name store 106. In one embodiment, the electronic marketplace 108 includes several computer systems that are interconnected using one or more computer networks. The systems facilitate browsing and purchasing/leasing of goods and services using various client devices such as client device 112. In one embodiment, the electronic marketplace 108 is generally responsible for providing communication with client devices 112, 114, and 116 via a network 110, such as the Internet. The front end communication provided by the electronic marketplace 110 may include generating text and/or graphics, possibly organized as a Web page or other user interface using hypertext transfer or other protocols in response to information inquiries, or requests received from the client devices. Non-limiting examples to such user interfaces are shown in FIGS. 2, 3, 4, and 6.

The domain name service 102, electronic marketplace 108, and client devices 112, 114, and 116 may be configured for communication via a network 110. The network 110 may be a wired and/or wireless network, a cable network, a local area network ("LAN"), a larger network, such as a wide area network ("WAN"), or a collection of networks, such as the Internet, etc. Because protocols for network communications, such as TCP/IP, are well known to those skilled in the art of computer networks, these protocols and other methods used to implement the network 110 are not disclosed in further detail herein.

The operating environment 100 may also include client devices 112, 114, and 116. The client devices 112, 114, and 116 allow a lessor (e.g., using client device 112) and lessee(s) (e.g., using client devices 114 and 116) access to the electronic marketplace 110 and the domain names service 102. The client devices 112, 114, and 116 may be any one of a number of computing devices, including, but not limited to, personal computers (PCs), laptop computers, personal digital assistants (PDAs), set-top boxes, mobile telephones, digital media players, electronic reader devices, two-way pagers, etc.

The operating environment 100 depicted in FIG. 1 is illustrated as a distributed computer environment, including several computer systems that are interconnected using one or more computer networks. However, it will be appreciated by those skilled in the art that the operating environment 100 could have fewer or greater components than are illustrated in FIG. 1. For example, the operating environment 100 could include various Web services, components, and peer-to-peer network configurations. Thus, the depiction of the operating environment in FIG. 1 should be taken as illustrative and not limiting to the present disclosure.

One skilled in the relevant art will also appreciate that the data and/or components described above may be stored on a computer-readable medium and loaded into a memory of the domain name service 102 and/or domain name data store 106 using a drive mechanism associated with the computer-readable medium, such as a floppy, CD-ROM, DVD-ROM, or network interface. Further, the components can be included on a single device or distributed in any manner. For example, all components could be located on the domain name service 102. Furthermore, the components shown in FIG. 1 represent an illustrative embodiment. In other embodiments, components, e.g., valuation component 104, can be removed, or their functionality can be provided by another component.

As noted above, the owner of a domain name may lease a domain name to another party so that any user who accesses the leased domain name is redirected to another network resource identified by the other party. In some cases, a potential lessee who wishes to make a network resource available may have difficulty selecting a domain name or may be interested in using a domain name registered to someone else. Accordingly, the domain name service 102 and/or the electronic marketplace 108 may be configured to enable a potential lessee to search for names available for lease and/or perhaps purchase. In one embodiment, the potential lessee may conduct a keyword search for available domain names via a search engine and search interface. Search engines and interfaces are known in the art, and thus, need not be described in further detail herein. In yet other embodiments, a potential lessee may search for available domain names by category. For example, a potential lessee may desire a domain name under the category "diets." Upon selection of the category, the domain names falling in the category are presented via one or more user interfaces, e.g., the user interface display 200, depicted in FIG. 2, displayed by a browser implemented by a client device, e.g., client device 114.

Those skilled in the art will recognize that a plurality of potential lessees may be interested in the same domain name. To maximize the monetary value of the domain name, the domain name service 102 may enable multiple potential lessees to bid on the use of a domain name available for lease in an auction format. Thus, in the illustrated embodiment, the user interface 200 is configured to enable a potential lessee to select a domain name from the search results and bid against other potential lessees for a lease to the domain name. In the illustrated example, the domain name search results 202 for the search term or category "diets" are displayed in the user interface 200. The search results include www.diet.com 204, www.dieters.com 206, and www.thebestdiet.com 208. The current bid price of each domain name is displayed at 210A, 210B, and 210C, respectively, providing the potential lessee with the most recent bid price on lease of the domain name. The number of bids placed on each domain name is displayed at 212A, 212B, and 212C, respectively, providing the potential lessee the number of other bids that have been placed on the domain name. If a potential lessee wishes to place a bid on a domain name, they may do so by selecting the domain name's corresponding "BID" button 214A, 214B, and 214C.

Figure 2:
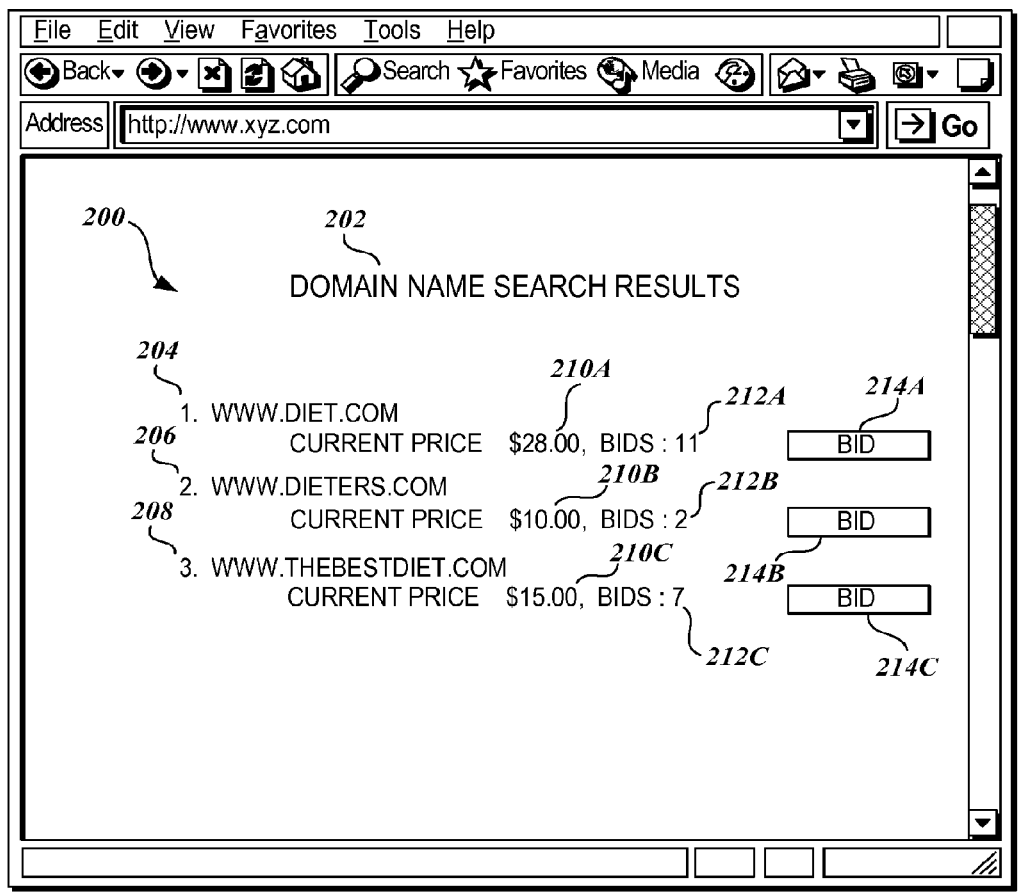
FIG. 2 is a pictorial diagram of an illustrative user interface displaying results from a search for domain names available for lease.

For example, if a potential lessee wishes to lease one of the domain names illustrated in FIG. 2, i.e., www.diet.com 204, www.dieters.com 206, or www.thebestdiet.com 208, the potential lessee may compare the prices and number of bids on each domain name and determine that www.diet.com 204 is likely the most popular of the three search results. The potential lessee may then decide to place a bid on that domain name and select its corresponding "BID" button 214A.

In another embodiment, the user interface 200 may be configured to provide a flat or fixed lease price for a domain name for a specified period of time. In such embodiments, the user interface 200 may present the fixed price for a specified period of time (e.g., 24 hours) with the search results. The potential lessee may select the domain name in which he or she was interested and pay the fixed price as opposed to submitting a bid in an auction as described above. One skilled in the art will recognize that there are number of methods that can be used to obtain a lease to a domain name. For example, in addition to fixed price sales and auctions, third parties could lease domain names in exchange for a lease to one or more of its own domain names, in exchange for other goods and services, or in exchange for points in a points-based exchange system. Thus, the examples provided herein should not be construed as limiting. A bid, a fixed price offer, or an offer to lease in exchange for some other item of value may be considered an offer by the potential lessee to lease the domain name. If such an offer is accepted by the domain name service 102, traffic to the domain name will be redirected as described in more detail below.

Figure 3:
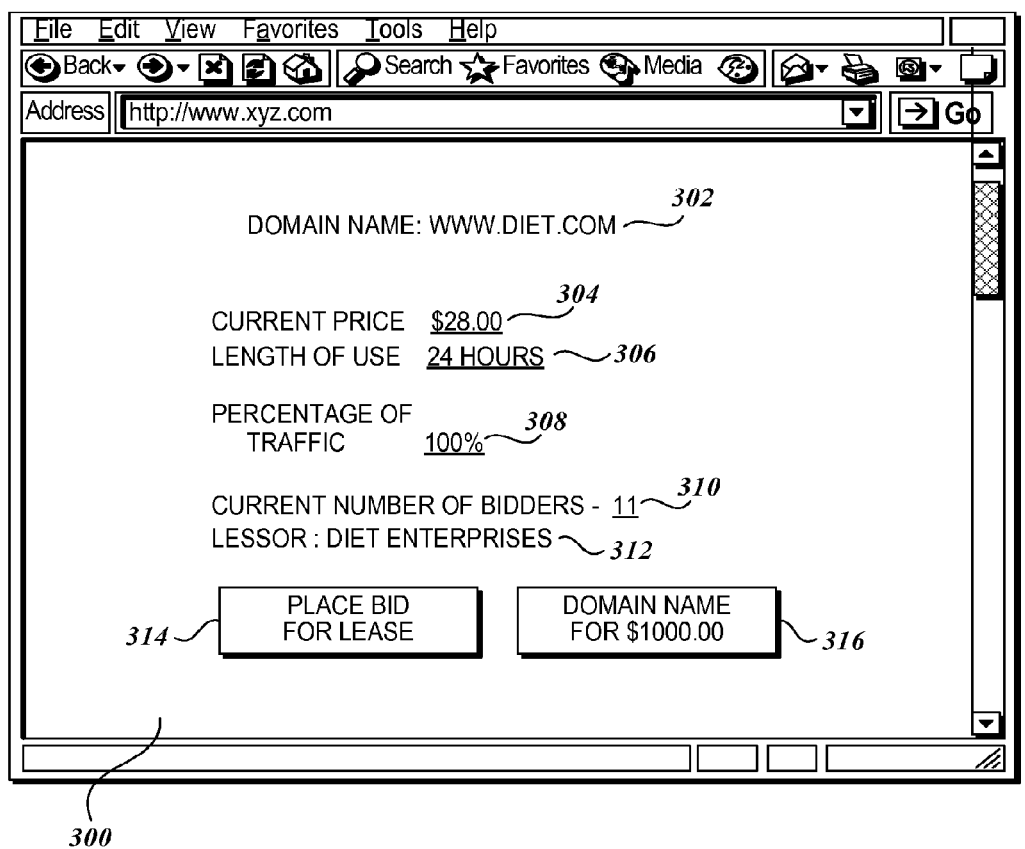
FIG. 3 is a pictorial diagram of an illustrative user interface displaying an option to place a bid for leasing a domain name.

Once a potential lessee has selected a domain name for lease and selected the corresponding "BID" button 214A, 214B, 214C, the potential lessee may be presented further information about the domain name and its lease terms. An illustrative user interface 300 for presenting such information is depicted in FIG. 3. More specifically, the current bid price 304 to lease the domain name www.diet.com, e.g., "$28.00," is displayed along with a length 306 of the domain name lease, e.g., "24 HOURS." In the illustrated embodiment, the lease for which the potential lessee is bidding lasts for a specified period of time duration, e.g., 24 hours. Thus, any potential lessee who leases the domain name will receive the benefits of redirects from the leased domain name for 24 hours. However, those skilled in the art will appreciate that the lease may be of any length specified by the lessor, e.g., one minute, six months, one year, indefinite, etc. In some embodiments, the potential lessee may be presented an option to place a bid for a lease of longer or shorter length, and thus, may vary his or her bid accordingly. In such cases, the lessor (or domain name service 102 or electronic marketplace 108) may determine the winning bid based on various business rules or other relevant criteria. In yet other embodiments, the start and end time of the lease length may be displayed and/or varied by the lessor/lessee. In such embodiments, the lessee may also be presented an option to place a bid for a particular lease length, e.g., one hour, with a specified start and end time, e.g., Dec. 5, 2010, at 10:00 AM PST to Dec. 5, 2010, at 11:00 AM PST.

In addition to price and lease length, a percentage of traffic being leased 308, e.g., "100%," is displayed in the user interface 200. Thus, in the illustrated example, the potential lessee who leases the domain name will receive the benefit of all of the traffic the domain name receives. In other words, 100% of the traffic directed to the leased domain name will be redirected to a network resource identified by the lessee. The term "traffic," as used herein, refers to each instance a domain name is accessed, e.g., by entering the domain name in the address bar of a browser or by virtue of a hyperlink.

In the illustrated example, because the percentage of traffic being leased is 100%, each access of the domain name www.diet.com will be redirected to a network resource specified by the lessee during the period of the lease. In another embodiment, a domain name may be leased to multiple lessees. Thus, each lessee may receive a portion of the traffic directed to the leased domain name. For instance, a domain name may have three lessees where the first lessee leases 50% of the domain name traffic; the second lessee leases 35% of the domain name traffic; and the third lessee leases the remaining 15% of the domain name traffic. Accordingly, the network resource identified by each lessee will receive only the percentage of the redirected traffic they purchased. Thus, if the leased domain name is accessed 100 times, 50 will be redirected to the network resource identified by the first lessee, 35 will be redirected to the network resource identified by the second lessee and 15 will be redirected to the network resource identified by the third lessee. In some embodiments, the traffic may be redirected serially, e.g., the first 50 accesses will be redirected, followed by the next 35, etc. In other embodiments, users are redirected randomly until the percentages are reached. In yet other embodiments, a weighted distribution is employed based on, e.g., bid price, percentage of traffic, identity of lessee, etc., or some combination thereof. In yet other embodiments, the lessor retains a portion of the traffic.

Although price, length of lease, and percentage of traffic have been described herein as parameters under which a domain name may be leased, those skilled in the art will appreciate that there may be additional parameters under which a domain may be leased. Such parameters may be specified by the lessor and/or requested by the lessee. In some cases, such requests by the lessee may require an adjustment (i.e., increase or decrease) of the purchase price. Given the variety of parameters under which a domain name may be leased, the examples presented above should not be construed as limiting.

Returning to FIG. 2, the current number of bidders 310 for the domain name lease may also be displayed in user interface 200. As noted above, the current number of bidders 310 may be used to gauge interest in the domain name. In addition, the identity of the lessor 312 may also be displayed. If the potential lessee wishes to place a bid for lease of the domain name, the potential lessee may do so by selecting a "PLACE BID FOR LEASE" button 314. However, in some embodiments, a potential lessee may decide that rather than leasing the domain name, he or she would prefer to purchase the domain name outright. Accordingly, an "OPTION TO BUY" button 316 may be provided in the user interface 200 that gives the potential lessee the option to purchase all right, title and interest in the domain name for a fixed price that is generally higher than the price for obtaining a lease. In the illustrated example, the "OPTION TO BUY" button 316 includes the fixed price of the domain name, e.g., "$1000." In some embodiments, the fixed purchase price is set manually by the domain name owner. In yet other embodiments, the fixed purchase price is determined algorithmically by the domain name service 102, e.g., by the valuation component 500 of the domain name service 102. Such algorithms may determine an appropriate purchase price based on a wide variety of: criteria, e.g., past performance of the domain name; number of bidders for the domain name; highest, lowest, or average (or some combination thereof) bid; prior purchase price history; current or past traffic; etc., or any combination thereof. The valuation component 500 will be described in more detail below in reference to FIG. 5.

In another embodiment, the user interface 300 may be further configured to provide recommendations to a lessee based on the domain name the lessee is placing a bid on. For example, the lessee may be bidding on a domain name for electronics. Thus, in addition to information concerning the domain name the lessee is bidding on, the user interface 300 would also display other recommended domain names for electronics. In one embodiment, the recommendation of a domain name would be based on the number of bidders for the additional domain names. However, one skilled in the art will appreciate that there are a number of methods that may be used to recommend domain names. Thus, the example provided here should not be construed as limiting.

Figure 4:
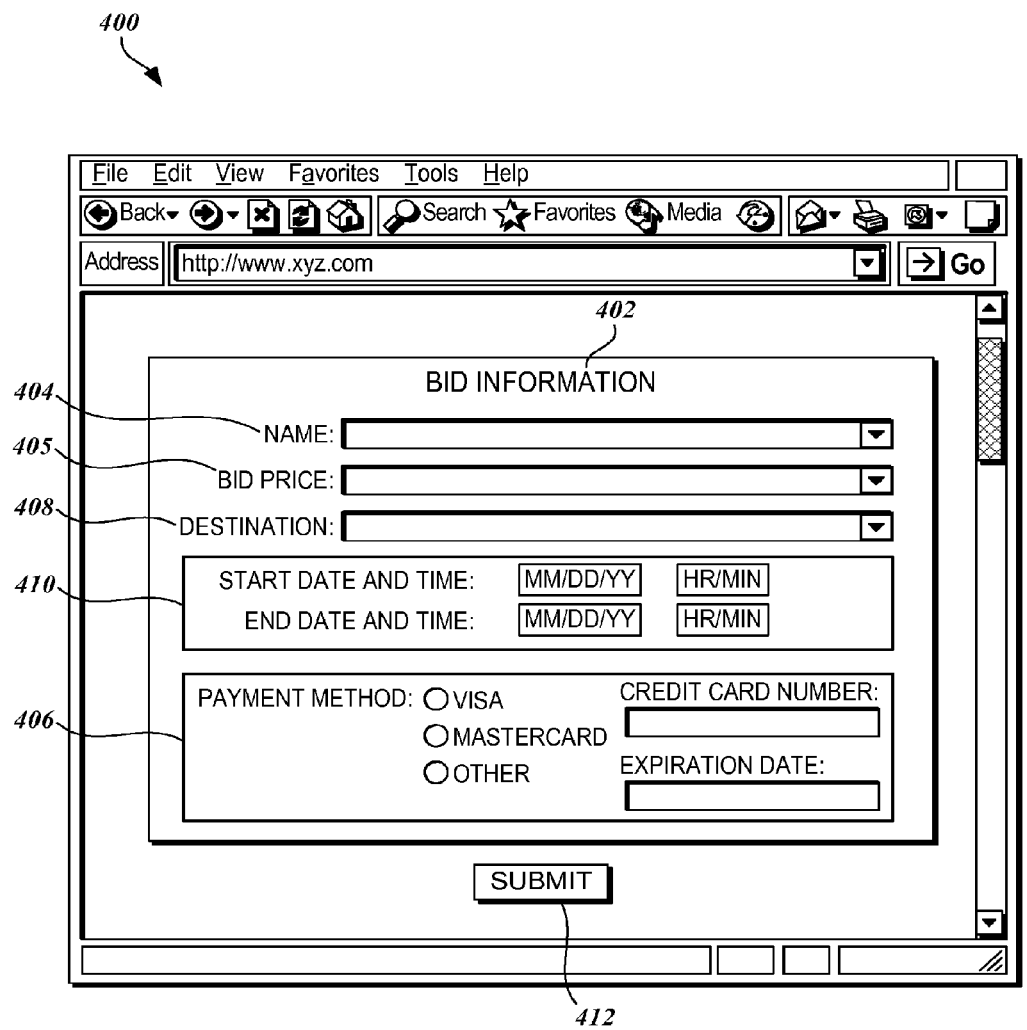
FIG. 4 is a pictorial diagram of an illustrative user interface displaying prompts for entering information regarding a bid placed by a potential lessee.

Referring now to FIG. 4, if the potential lessee selects the "PLACE BID FOR LEASE" button 314, a user interface 400 may be displayed that enables the potential lessee to enter information 402 for the domain name lease. For example, a "LESSEE NAME" text field 404 may be provided to prompt the potential lessee to enter his or her name. A "BID PRICE" field 405 may be provided to prompt the potential lessee to enter the bid price for the domain name lease. A "PAYMENT METHOD" field 406 may also be provided to prompt the potential lessee to enter the method by which he or she will pay to lease the domain name.

A "DESTINATION" text field 408 may also be provided to prompt the potential lessee to identify the network resource to which the leased domain name will be redirected. In some embodiments, the network resource to which the traffic is redirected is identified by another domain name. In yet other embodiments, the network resource is identified by an IP address or other unique address. Using the above example, the potential lessee may wish to redirect users who access the domain name www.diet.com to the network resource identified by the domain name www.jacksdietcom. Accordingly, the potential lessee may enter the domain name www.jacksdiet.com or the IP address for the same in the "DESTINATION" text field 408.

In the illustrated embodiment, a "START DATE AND TIME" and "END DATE AND TIME" field 410 is also provided to prompt the potential licensee to enter the time period of the domain name lease. For example, a potential lessee placing a bid on the domain name www.diet.com for a length of use of 24 hours may enter a start date and time of Nov. 18, 2010, at 2:00 PM PST and an end date and time of Nov. 19, 2010, at 3:00 PM PST in field 410. When the potential lessee has entered the bid information, he or she may submit the information by selecting a "SUBMIT" button 412. In one embodiment, the bid information is stored along with the domain name in the domain name data store 106.

Once the bid is submitted, the electronic marketplace 108 may process the bid in accordance with its existing electronic auction functionality. The winner of the electronic auction will be notified and payment will be processed by the electronic marketplace 108 accordingly. Since electronic auctions are known in the art, such auction functionality need not be described in further detail herein. Once payment has been processed, the domain name service 102 may implement the redirect to the network resource identified by the lessee for the time period specified. In addition, the domain name service may monitor the performance of the leased domain name for reporting purposes, as will be discussed in more detail below. If the domain name is purchased outright, the domain name service 102 may facilitate transfer of the domain name to the new owner. In some instance, the domain name service 102 may itself be a registrar for domain names offered for lease or purchase. In some embodiments, the domain name service 102 and/or the electronic marketplace 108 may change a fee and/or retain a percentage of the winning bid price or purchase price for processing the auction transaction, the fixed price transaction or the transfer of ownership.

In another embodiment, the electronic marketplace 108 and/or the domain name service 102 may resolve conflicting bids for a domain name. For instance, two lessees may bid to lease a domain name for times that overlap (e.g., the first lessee wishes to lease the domain name from 12:00 to 1:00, and the second lessee wishes to lease the domain name from 12:30 to 1:30). In such embodiments, the electronic marketplace may be configured to determine use of the domain name based on the option that offers the maximum value to the domain name owner. In this example, the first lessee has the highest bid. Thus, the first lessee will receive use of the domain name for his desired time period. In turn, the second lessee may be presented with the option of leasing the domain name for the time period remaining after the first lessee's lease period expires.

In another embodiment, the electronic marketplace 108 and/or the domain name service 102 may be configured to alert bidders to which bidder is currently "winning" the auction. In other words, each bidder may be notified of the bidder that currently has the best bid. For instance, two lessees may again be bidding on use of the same domain name. The second bidder may submit a larger bid than the first bidder. In turn, the electronic marketplace may deliver a notification to the first bidder that the second bidder has submitted a higher bid. In addition, the notification may contain recommendations to the first bidder to assist the first bidder in determining his next action. For instance, the notification may recommend that the bidder change the time of his bid or increase the value of his bid.

Figure 5:
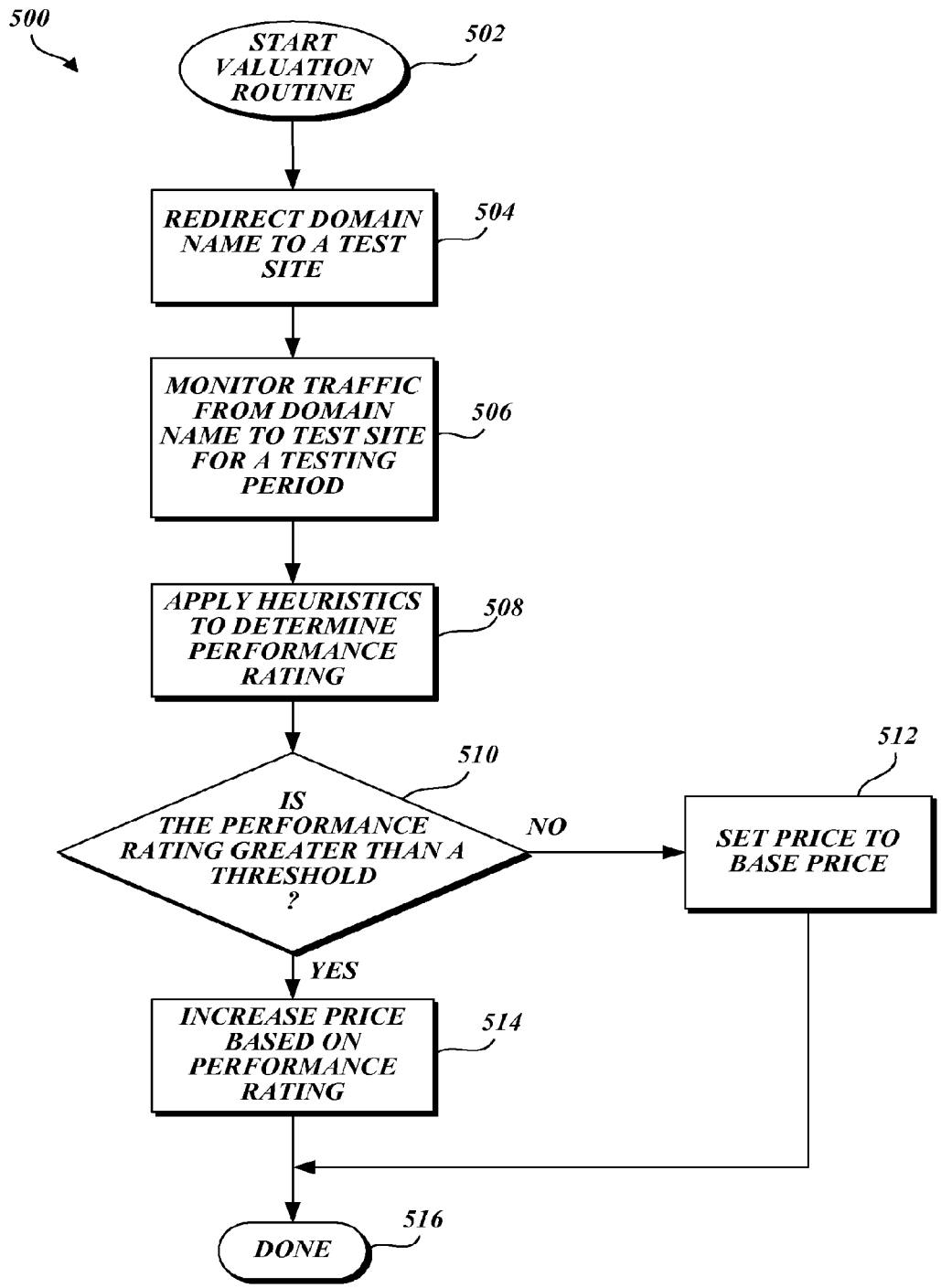
FIG. 5 is a flow diagram of an illustrative routine for determining a value for a domain name.

With reference now to FIG. 5, an illustrative valuation routine that may be implemented by the valuation component 500 of the domain name service 102 is depicted. One factor that may be used in determining a purchase price for a domain name is the amount of traffic the domain name generates since the amount of traffic may be an indication of the of the popularity of the domain name. Accordingly, in the illustrated embodiment, the valuation component monitors traffic to the domain name for a test period and sets the purchase price of the domain name based on the monitored traffic. More specifically, the valuation component 500 begins at block 502 and proceeds to block 504 where the component 500 redirects traffic to the domain name to a test site e.g., a network resource used for testing purposes. In another embodiment, traffic-may be redirected to a potential lessee site. In yet another embodiment, a test side may be configured to include a questionnaire to obtain more information from users. For example, a test site may contain a questionnaire to determine which Web site the user was attempting to access.

At block 506, the redirected traffic is monitored for a testing period. For example, the test site implements a counter that tracks the number of times the test site is accessed from the monitored domain name. In some embodiments, this information is analyzed over time to determine, e.g., the frequency with which the domain name is accessed, the time periods during which the domain name experiences the most traffic, whether traffic is increasing, decreasing, or stable, etc. This information may then be used to determine a purchase price for the domain name. In another embodiment, the valuation component 500 may be configured to monitor a domain name on existing search engines. For, example, a domain name may be one of the first to appear in response to a search on the subject matter of the domain name. This information may be used to determine a purchase price for the domain name. In yet another embodiment, other domain names that are similar to the current domain name candidate may be stored in a database. The performance of these stored domain names may be tracked over time. In turn, the historical performance of the stored domain names may be used to determine the price for the current domain name.

In yet another embodiment, the value of a domain name to a potential lessee may be used in the determination of a purchase price for the domain name. For example, a lessee may deal in office products and the domain name owner may own the domain name www.officeproducts.com. The domain name owner could then target that particular lessee with the domain name www.officeproducts.com and use the subject matter connection between the domain name and the lessee to determine the purchase price for the domain name. Those skilled in the art will recognize that such information as provided in the embodiments and examples presented above may also be used to determine bid prices for the domain name as well as or in lieu of purchase price.

In the illustrated embodiment, the total number of times the test site is accessed during the testing period, is monitored using the domain name of the test site. The monitored domain name is then used to determine set the purchase price of the domain name. For instance, if the testing period is one hour and the test site is accessed via the monitored domain name one hundred times (the "access count"), the access count is used to determine the purchase price of the domain name.

Accordingly, at block 508, heuristics may be applied to the access count to determine a performance rating for the monitored domain name. For example, if the monitored domain name is accessed a high number of times relative to other domain names in the same category (e.g., relative to the other domain names related to "diet" using the above example), then the monitored domain name may receive a higher performance rating. To the contrary, if the monitored domain name is accessed a low number of times during the test period relative to other domain names in the same category, the domain name may receive a lower performance rating. One skilled in the art will appreciate that there are numerous methods and heuristics that may be used to determine a performance rating. Thus, the examples presented above should not be construed as limiting.

At decision block 510, a determination is made as to whether the performance rating is above a threshold. In one embodiment, the threshold is set manually, e.g., by the domain name owner. In another embodiment, the threshold is set automatically by the domain name service 102. For example, the domain name service 102 may set automatically set the threshold based on a median number of times domain names in the same category (e.g., "diet" using the above example) were accessed during testing. If the performance rating does not exceed the threshold, the purchase price of the domain name is set to a base price. In some embodiments, the base price is specified by the domain name owner. In other embodiments, the base price is determined, algorithmically, e.g., based on the average purchase price of domain names in the same category as the monitored domain name. Those skilled in the art will recognize that the base price may be determined manually or automatically using a wide variety of methods. Thus, the examples presented above should not be construed as limiting.

If it is determined in decision block 510 that the performance rating exceeds the threshold, the purchase price of the monitored domain name is increased in block 514 based on the performance rating. In one embodiment, performance is rated on a scale from one to 100. In such an embodiment, for every 1 point increment increase in the performance rating, the purchase price may increase by $50. While this is one possible example of how the purchase price may increase based on performance rating, those skilled in the art will appreciate that the purchase price may be determined based on a wide variety of relationships between performance and price, whether such relationships are linear (as just described) or non-linear. Once the purchase price has been determined, the component 500 then terminates in block 516.

Figure 6:
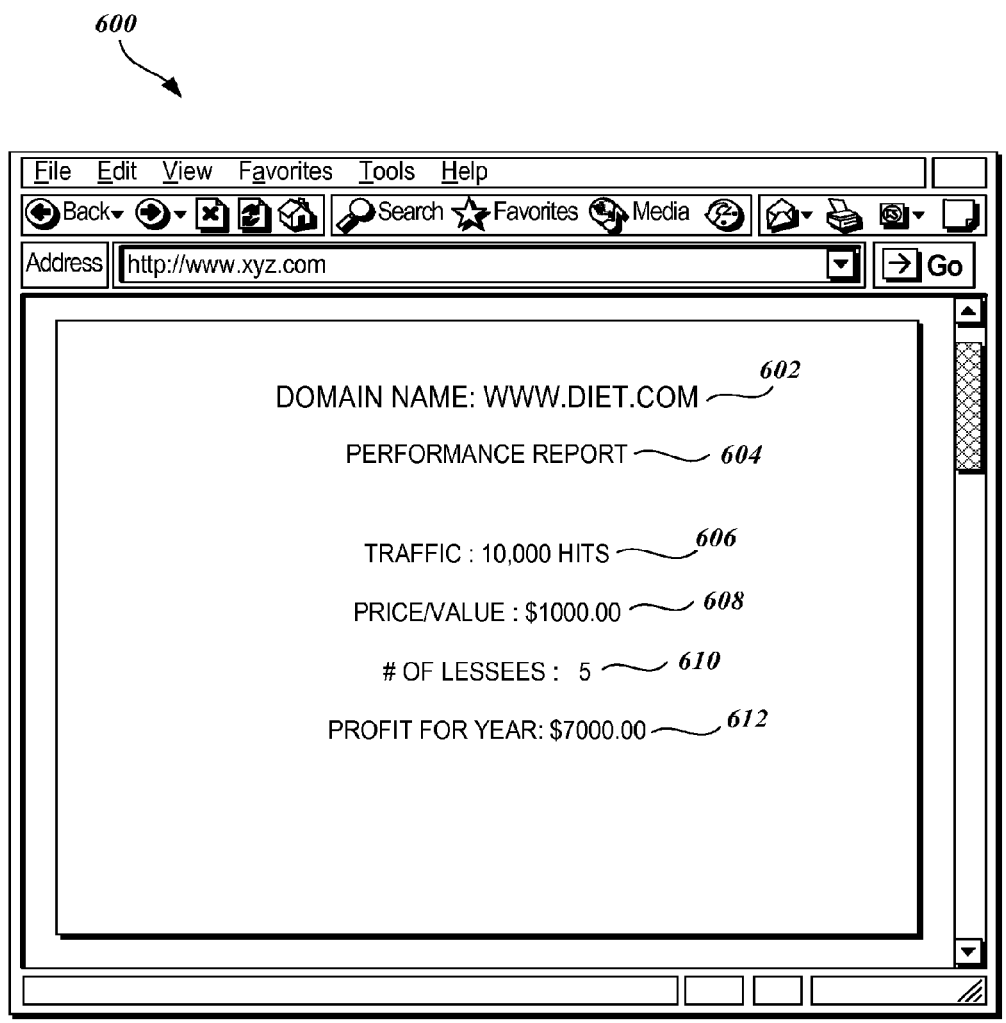
FIG. 6 is a pictorial diagram of an illustrative user interface displaying a domain name performance report.

FIG. 6 is a pictorial diagram of an illustrative user interface 600 displaying a domain name performance report 104. In one embodiment, the domain name service 102 tracks the performance of a domain name while leased. Tracking the performance of the domain name provides the lessor with additional information when setting the purchase price or starting/minimum bid of a domain name to ensure maximum profitability. In the user interface 600, the domain name 602 subject to the performance report is displayed. The total traffic 606, e.g., "10,000," since leasing began is also displayed. The value 608 of the domain name as determined by the valuation component 500, e.g., "$1000.00," may also be displayed. The number of lessees 610 since leasing began, e.g., "5," may also be displayed. Finally, the total profit for the year 612 obtained by leasing the domain name, e.g., "$7000.00," may be displayed. Those skilled in the art will appreciate that by utilizing such a report, the domain name owner may further analyze the value of the domain name. Using the reported information, the domain name owner may consider, inter alia, whether to continue offering the domain name for lease, the purchase price or starting/minimum bid for a domain name, whether to retain a percentage of the traffic to the domain name, etc. Those skilled in the art will also appreciate that less, more, to different information related to the domain name may be included in the performance report without departing from the spirit and scope of the present disclosure.

In another embodiment, the lessee may also receive a performance report from the domain name service 102. In such embodiments, the lessee performance report may contain similar information to the lessor performance report. For example, the lessee performance report may contain the traffic of the Web site during the lessee's lease period. In addition, the lessee performance report may contain information comparing the performance of the domain name between different lessees. For example, if a domain name had four lessees, each lessee may receive a report comparing and contrasting the performance of the domain name during each lessee's respective lease terms. If one of the lessees received a more significant amount of traffic by leasing the domain name during a specific time period, the other lessees could use that information to influence future leases of the domain name. The lessee performance report may also contain recommendations of other domain names. For example, a lessee performance report could include other domain names within the same subject matter as the leased domain name and information concerning their performance. Such information could then be used by the lessee when making future leases of domain names.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

While illustrative embodiments have been illustrated and described, it will be appreciated that various changes can be made therein without departing from the spirit and scope of the invention.

What is claimed is:

1. A system for leasing a domain name to a third party, the system comprising:
   one or more computing devices programmed to:
      identify a domain name available for lease;
      obtain an offer from a first party to lease the domain name;
      accept the offer from the first party to lease the domain name for a period of time;
      assign a percentage of total requests corresponding to the domain name to the first party for the period of time, the percentage being less than 100%;
      cause, for the period of time, requests corresponding to the domain name to be interchangeably redirected to a network resource identified by the first party and to one or more additional network resources, wherein each of the one or more additional network resources is associated with an additional party to which the domain name has been leased, and wherein the requests are interchangeably redirected to the network resource identified by the first party in accordance with the percentage of total requests assigned to the first party; and
      generate a valuation of the domain name.

2. The system of claim 1, wherein the one or more computing devices are further programmed to accept an offer from the first party to purchase the domain name in lieu of leasing the domain name.

3. The system of claim 2, wherein the one or more computing devices are further programmed to recommend a purchase price for the domain name based at least in part on the valuation.

4. The system of claim 3, wherein the one or more computing devices are further programmed to:
   collect information corresponding to the requests to the domain for the period of time and information corresponding to requests to at least one additional domain name;
   compare the information corresponding to the requests to the domain for the period of time and the information corresponding to requests to the at least one additional domain name;
   wherein the valuation is based on a relative performance of the domain name compared to the at least one additional domain name.

5. The system of claim 1, wherein the one or more computing devices are further programmed to monitor performance of the domain name.

6. The system of claim 1, wherein the offer to lease the domain name comprises a bid for purchasing a lease to the domain name in an auction.

7. The system of claim 1, wherein the offer to lease the domain name comprises a fixed price offer for purchasing a lease to the domain name.

8. A computer-implemented method for leasing a unique name of a network resource, the method comprising:
   generating a valuation of a unique name of the network resource;
   accepting an offer to lease the unique name of the network resource to a lessee for a specified period of time, wherein the offer corresponds to a minimum portion of requests corresponding to the unique name;
   receiving requests to the unique name of the network resource; and
   causing the requests corresponding to the unique name to be interchangeably redirected to a second network resource identified by the lessee and one or more other network resources, in response to accepting the offer to lease the unique name of the network resource, wherein less than all of the requests are redirected to the second network resource for the specified period of time;
   wherein the method is preformed under control of one or more configured computing devices.

9. The computer-implemented method of claim 8, wherein the unique name of the network resource available for lease is identified in response to a submitted search request.

10. The computer-implemented method of claim 8, further comprising accepting offers from another third party to concurrently lease the unique name of the network resource for the specified period of time.

11. The computer-implemented method of claim 10, further comprising causing a portion of the requests corresponding to the unique domain name to be redirected to a third network resource during the specified period of time, wherein the third network resource is identified by the another third party for whom another offer has been accepted.

12. The computer-implemented method of claim 8, wherein a lessor of the unique name retains rights to a portion of the requests corresponding to the unique name for the specified period of time, and wherein a portion of the requests is redirected to one or more network resources identified by the lessor.

13. The computer-implemented method of claim 8, wherein the offer to lease the unique name of the network resource comprises a bid for purchasing a lease to the unique name of the network resource in an auction.

14. The computer-implemented method of claim 8, wherein the offer to lease the unique name of the network resource comprises a fixed price offer for purchasing a lease to the unique name of the network resource.

15. The computer-implemented method of claim 8, wherein the offer to lease the unique name of the network resource includes at least a purchase price for a lease to the unique name of the network resource and identification information for a second network resource to which at least a portion of traffic is to be redirected.

16. The computer-implemented method of claim 8, further comprising accepting an offer to purchase the unique name for the network resource in lieu of leasing the unique name of the network resource.

17. The computer-implemented method of claim 16, further comprising recommending a price for purchasing the unique name of the network resource based at least in part on the valuation.

18. The computer-implemented method of claim 17, wherein the valuation is based at least in part on performance of the unique name of the network resource.

19. The computer-implemented method of claim 8, further comprising recommending a price for leasing the unique name of the network resource based at least in part on the valuation.

20. The computer-implemented method of claim 8, wherein the valuation is generated based at least in part on a comparison of information associated with requests for the unique name of the network resource and one or more other unique names of network resources, wherein the unique name of the network resource and the one or more other unique names of the network resources are associated with a same category.

21. A non-transitory computer readable storage medium storing instructions that when executed by one or more computing devices perform a method, the method comprising:
 enabling a third party to submit an offer to lease a unique name of a first network resource, wherein the lease is for a specified period of time;
 recommending a price for leasing the unique name of the first network resource;
 in response to accepting the offer, causing a portion of requests corresponding to the unique name of the first network resource, but less than all of the requests, to be redirected to a second network resource identified by the third party for the specified period of time; and
 during the specified period of time, randomly redirecting any single request associated with the unique name to any one of a plurality of network resources, wherein the plurality of network resources include the second network resource.

22. The non-transitory computer readable storage medium of claim 21, wherein the method further comprises enabling the third party to submit an offer to purchase the unique name of the first network resource in lieu of leasing the unique name of the first network resource.

23. The non-transitory computer readable storage medium of claim 21, wherein the method further comprises:
 collecting information corresponding to requests to the unique name for a period of time and information corresponding to requests to at least one or more other unique names; and
 determining a relative performance of the unique name compared to the one or more other unique names based on the collected information;
 wherein the recommended price for leasing the unique name of the first network resource based at least in part on the relative performance of the unique name compared to the one or more other unique names.

24. A system for leasing a domain name to a third party, the system comprising:
 a data store that stores domain names available for lease; and
 one or more computing devices communicatively coupled to the data store, wherein the one or more computing devices are programmed to:
  accept an offer to lease a domain name to an offeree for a period of time, wherein the offer specifies a portion of requests to the domain name to be interchangeably redirected to a network resource identified by the offeree;
  generate a valuation of the domain name; and
  cause requests associated with the domain name to be interchangeably redirected for the period of time to a network resource identified by the offeree and to one or more additional network resources, wherein each of the one or more additional network resources is associated with an additional party to which the domain name has been leased, and wherein the requests are interchangeably redirected to the network resource identified by the offeree in accordance with the specified portion of requests.

25. The system of claim 24 wherein the one or more computing devices are further programmed to solicit offers to lease the domain name.

26. The system of claim 24, wherein the valuation is based at least in part on a performance rating of the domain name, wherein the performance rating based at least in part on a comparison of information associated with requests for the domain name and one or more other domain names, and wherein the domain name of the network resource and the one or more other domain names are associated with a same category of domain names.

27. The system of claim 26, wherein the valuation is increased when the performance rating satisfies a threshold.

* * * * *